UNITED STATES PATENT OFFICE.

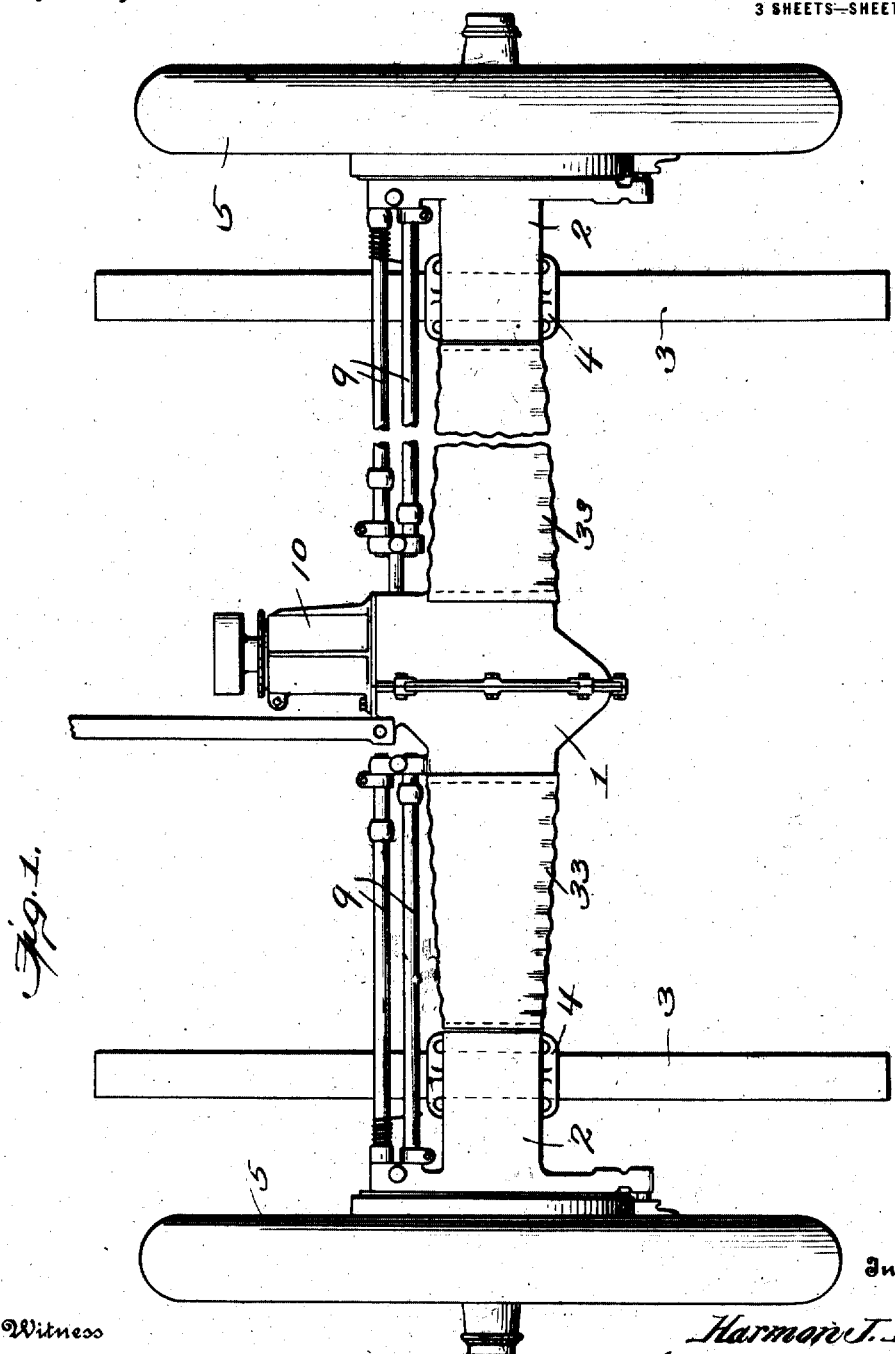

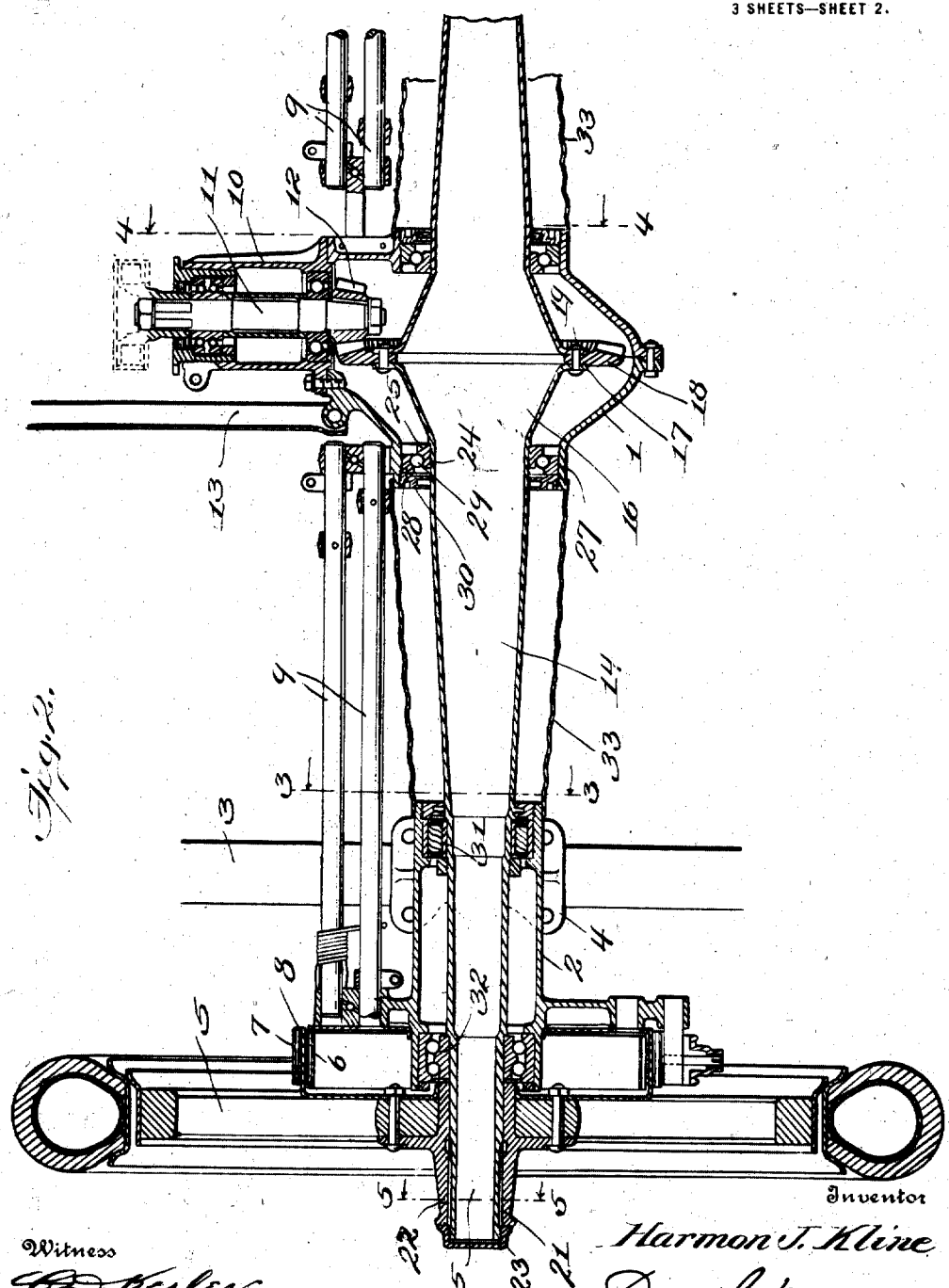

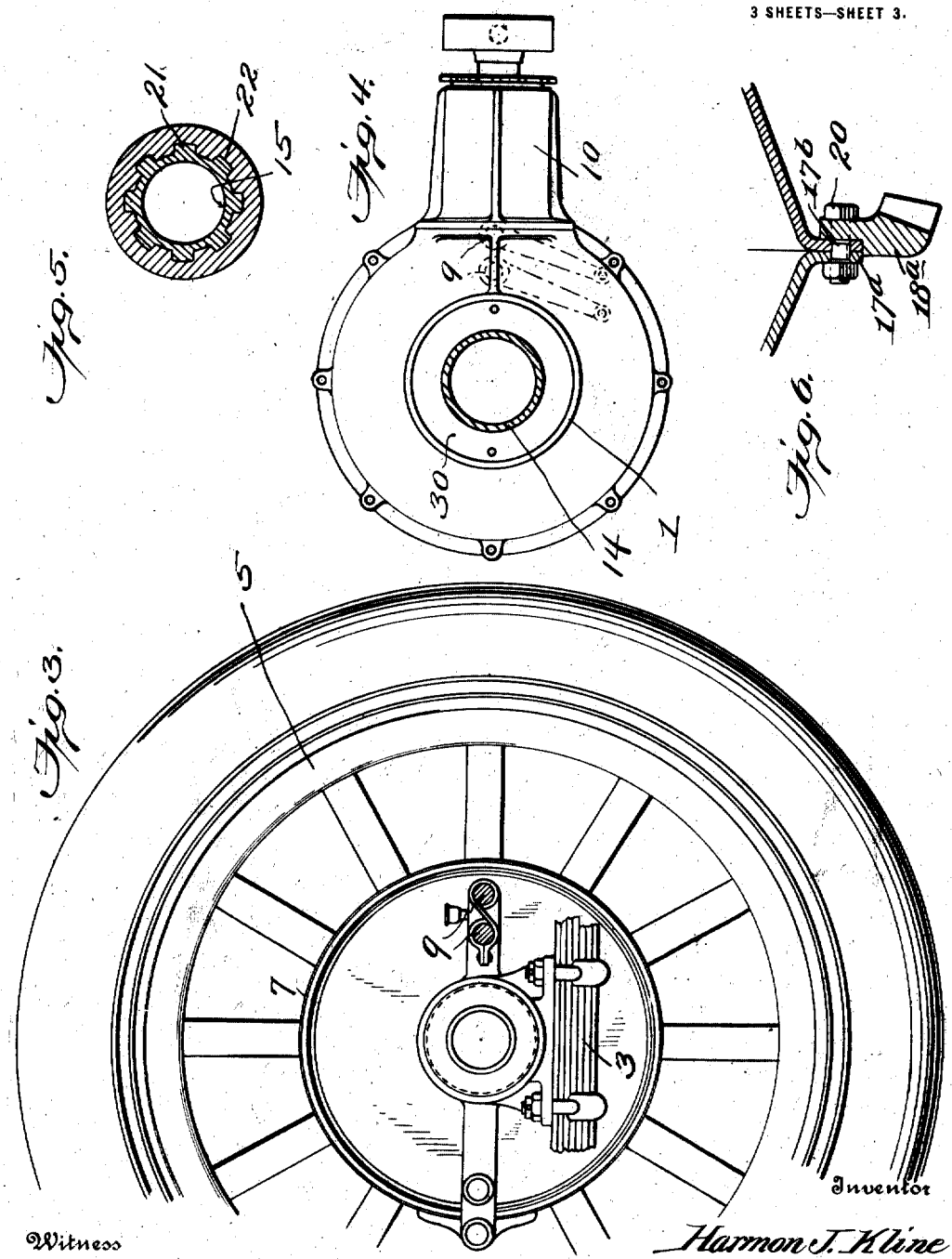

HARMON J. KLINE, OF LANSING, MICHIGAN.

DRIVING-AXLE FOR MOTOR-VEHICLES.

1,275,444.      Specification of Letters Patent.      Patented Aug. 13, 1918.

Application filed July 17, 1917. Serial No. 181,094.

*To all whom it may concern:*

Be it known that I, HARMON J. KLINE, a citizen of the United States, residing at Lansing, in the county of Ingham and State of Michigan, have invented new and useful Improvements in Driving-Axles for Motor-Vehicles, of which the following is a specification.

The present invention relates to improvements in axles for automobiles and other motor vehicles, and more especially to the driving axles therefor. The primary object of the invention is to provide a driving axle of this kind which is relatively light in weight, inexpensive in construction and durable, it being so constructed that it possesses the maximum weight and torsion-sustaining power for its weight, and it renders it unnecessary to employ the usual differential gearing, the axle, according to the present invention, being tubular and of novel form to sustain the weight and torsional strains imposed thereon and it is directly keyed or otherwise fixed to both wheels of the pair.

To these and other ends, the invention consists in certain improvements, and combinations and arrangements of parts, all as will be hereinafter more fully described, the novel features being pointed out particularly in the claims at the end of the specification.

In the accompanying drawing:

Figure 1 is a top plan view of the rear driving axle of an automobile, the same being constructed in accordance with the present invention.

Fig. 2 represents a section taken horizontally and axially through one end of the axle, the section being on an enlarged scale.

Fig. 3 represents a section on the line 3—3 of Fig. 2 looking in the direction of the arrows.

Fig. 4 represents a section on the line 4—4 of Fig. 2 looking in the direction of the arrows.

Fig. 5 represents a section on the line 5—5 of Fig. 2 looking in the direction of the arrows.

Fig. 6 is a detail sectional view showing a modified mode of securing the driving gear to the axle.

Similar parts are designated by the same reference characters in the several views.

The driving or rear axles of automobiles and motor vehicles, as usually constructed, are split in the center to form a pair of axle sections, one axle section being keyed or otherwise fixed to each wheel, and the axle sections are connected by a differential gearing which serves as a medium for the application of power to the axle sections, the differential being employed for the purpose of equalizing the application of power to the two wheels. It is also usual to inclose the axle sections by a housing which extends continuously between the wheels. Such constructions, however, have proven expensive, they are heavy, and differential gearings are often a source of expense and trouble. The present invention provides a driving axle which is relatively light in weight and inexpensive in cost and it obviates most of the difficulties found to exist in the usual driving axles employing differentials. The preferred embodiment of the invention is shown in the accompanying drawing and will be hereinafter described in detail. It is to be understood, however, that the invention is not restricted to the precise construction and arrangement shown, as equivalent constructions and arrangements are contemplated and will be included within the scope of the claims.

In the present instance, the axle housing is composed of three sections, the middle or central section 1 being adapted to house the driving gear and pinion, and the end sections 2 having the springs 3 attached thereto by the usual clips connected to spring seats 4, and these end sections 2 of the housing carry the brakes for the wheels 5, inner and outer band brakes 6 and 7 being shown in the present instance which coöperate with the brake drum 8 of the respective wheels, and these band brakes may be operated by brake rods 9, such as those commonly employed. The central or middle housing 1 also has a housing 10 bolted or otherwise fixed thereto, this housing 10 inclosing the shaft 11 for the driving pinion 12, the shaft 11 being connected in the usual way to the propeller shaft driven by the engine, and a torque arm 13 is also attached to the central or middle housing 1 and to the chassis of the vehicle to sustain the torque applied to the axle by the driving pinion.

The axle, according to the present invention, comprises a pair of similar tubular sections 14 the outer ends 15 of which fit into the hubs of the respective wheels and the inner ends of which are flared or tapered into somewhat the form of a cone, the flare increasing toward the inner ends of these axle sections, as at 16, and the inner extremities of the axle sections are preferably formed into out-turned flanges 17. The inner ends of the axle sections are connected rigidly either directly to one another or through the medium of the driving gear. As shown in Fig. 2, the driving gear 18 which coöperates with the pinion 12 is of ring form and it is secured rigidly to the two axle sections and between the flanges 17 thereof by rivets 19. However, the inner ends of the axle sections may be formed with flanges 17a which are lapped directly against one another and are secured together by rivets 17b, and the driving gear 18a may be secured to the two flanges by a suitable number of bolts 20, as shown in Fig. 6.

The ends of the axle may be secured to the wheels in different ways. As shown, each outer end of the axle is fluted, as at 21, to fit into a correspondingly formed portion 22 of the wheel hub, a cap 23 being threaded or otherwise fitted upon the outer end of the axle and abutting against the wheel hub to retain the wheel from endwise displacement relatively to the axle.

The axle 14 sustains the weight of the vehicle as well as the driving strain applied to its driving wheels, it being understood that the axle is revoluble with the wheels but that the housing sections are non-rotatable. In consequence, suitable bearings are provided between the axle and the middle and end housing sections. As shown in Fig. 2, each section of the axle adjacent to the widely flared portion 16 is formed with a bearing seat 24 which is preferably cylindrical to receive a bearing member 25, and each side of the middle housing section 1 is formed with a sleeve-like extension 27 which is preferably cylindrical interiorly to receive a coöperating bearing member 28, balls or other anti-friction devices 29 coöperating with the two bearing members. An adjustment ring 30 for each bearing may be threaded or otherwise adjustably fitted into each end of the middle housing section. Similarly, each end housing section 2 is provided toward its inner and outer ends with bearings 31 and 32, anti-friction bearings being preferably employed, and in order to prevent dropping of oil or grease from the bearings of the axle and to protect these bearings from dust or mud, a sleeve-like boot 33 of leather or other suitable flexible material is fitted around the axle between each end housing section and the middle housing section, and the ends of the boots are secured to these housing sections.

The axle, composed of the oppositely flaring sections, is preferably constructed from tubing having an original diameter and thickness substantially equal to that of the end portion 15, the flaring of each section toward its inner end being produced preferably by expanding this portion from its original diameter to the enlarged diameter desired. By expanding the inner portion of each axle section to the larger diameter, the thickness of the wall of the axle section is diminished in accordance with the enlargement in the diameter, due to the drawing of the metal during the expanding operation, but this reduction in the thickness of the wall of the axle section is compensated for by the increase in its diameter which increases the section modulus or moment of inertia of this portion of the axle and, in consequence, the axle is well able to sustain the bending stress of the weight as well as the torsional strain imposed thereon. For example, if the wall thickness of the original tube is $\frac{3}{8}$ inch and the tube is expanded to a diameter double that of the original tube, the thickness of the wall of the expanded portion will be approximately $\frac{3}{16}$ inch. In addition to the increased strength of the middle portion of the axle, due to the increase in its diameter, will be the added strength imparted to the metal as an incident to the drawing action due to the compression of the fibers of the metal and the consequent increased uniformity and density of the metal. The strength of the axle will therefore be distributed according to the distribution of the weight and strain to be imposed thereon, and this strength will be the maximum for the weight of metal composing the axle, enabling the axle instead of the housing, as heretofore, to sustain the weight of the vehicle and, as a result, the housing may be relatively light and need not be continuous between the wheels.

The present invention enables the usual differential gearing, commonly employed heretofore, to be dispensed with for, by connecting the inner ends of the axle sections to one another and non-rotatably mounting the driving wheels on these axle sections, the driving power is applied to both driving wheels, which is advantageous when the vehicle is traveling in a straight course and it is also advantageous when only one of the wheels of the pair has traction both in the application of power or the brakes. In turning, the difference in the distances to be traveled by the wheels is compensated for by slippage of either or both wheels and at such times the axle will have ample strength to sustain the torsion imposed upon it. The arrangement of the present invention is also calculated to reduce wear of and damage to tires upon automobiles traveling at relatively high speed over uneven road surfaces, as the direct connection between the wheels prevents spinning of either wheel under the power applied thereto as such wheel rises from the road surface.

An axle embodying the present invention not only simplifies and cheapens the construction thereof, but the reduction effected in the weight of the axle results in much smoother riding qualities of the automobile to which it is applied and less wear upon the tires, as the weight of the axle is not sustained by the springs of the vehicle, and it is well known that heavy axles when vibrating or bouncing over uneven surfaces subject the body of the automobile to severe shocks and unduly wear and damage the tires. The lightness in weight of an axle constructed in accordance with the present invention, on the contrary, insures smooth riding qualities for the body of the automobile. The weight of the axle may, if desired, be further reduced by omitting one or both sets of brakes from the axle, it being preferable to omit the internal or so-called emergency brake from the axle and to mount such brake upon the transmission, as is the case in some automobiles, this arrangement being especially advantageous with an axle constructed in accordance with the present invention for the reasons that the braking action will be applied directly to both wheels of the pair with no opportunity of slippage of one wheel when the traction of the wheels of the pair, or the application of the brakes thereto, is unequal, and an increased braking action is attained due to the ratio of the driving gear and pinion without, however, the wear and tear to which differentials and tires are subjected when transmission brakes are used with the usual differentials.

I claim as my invention:—

1. An axle of the class described comprising a tube having means for non-rotatably mounting wheels on the ends thereof and having an intermediate portion of increased diameter, and means for applying power to the intermediate portion of the tube to turn the same.

2. A driving axle for motor vehicles comprising a tube adapted to receive wheels at its ends and having its intermediate portion of increased diameter and provided with means for rotating it, the thickness of the wall of the tube diminishing in directions from its ends toward its center.

3. A driving axle for motor vehicles comprising a tube having means at its ends for keying a pair of wheels thereon and flaring in directions from its ends toward its center, and means connected to the intermediate portion for applying driving power thereto.

4. A driving axle for motor vehicles comprising a pair of tubular sections each having a portion at one end of its ends to non-rotatably receive a driving wheel and flaring progressively toward its opposite end, the flared ends of the sections being rigidly connected, and driving means connected to the flared ends of the sections.

5. An axle for motor vehicles comprising a pair of tubular axle sections, each section adapted to receive a wheel at one end and having a progressively increasing diameter toward its opposite end, the thickness of the wall of the section diminishing as its diameter increases, and the sections being connected at their larger ends.

6. An axle of the class described comprising a pair of tubular sections each adapted to receive a wheel at one end and flaring toward its opposite end, the flared end of each section having an out-turned flange, and means rigidly uniting said flanges.

In testimony whereof I have hereunto set my hand in presence of two subscribing witnesses.

HARMON J. KLINE.

Witnesses:
LLOYD S. PATTERSON,
LEONARD E. CURPHEY.